(12) United States Patent
Osgoodby

(10) Patent No.: US 6,641,543 B1
(45) Date of Patent: Nov. 4, 2003

(54) FLAVORED THERMOMETER

(76) Inventor: Karen M. Osgoodby, 112 Spring Pl., Enumclaw, WA (US) 98022

( * ) Notice: Subject to any disclaimer, the term of this patent is extended or adjusted under 35 U.S.C. 154(b) by 0 days.

(21) Appl. No.: 09/765,467

(22) Filed: Jan. 22, 2001

(51) Int. Cl.[7] .............................................. A61B 5/00
(52) U.S. Cl. ..................................................... 600/549
(58) Field of Search ........................ 600/549; 374/106; 606/234, 240

(56) References Cited

U.S. PATENT DOCUMENTS

| | | |
|---|---|---|
| 2,425,945 A | 8/1947 | Leach |
| 2,844,031 A | 7/1958 | Rosenthal |
| 3,871,232 A * | 3/1975 | Pickett et al. ............... 116/217 |
| 5,217,475 A | 6/1993 | Kuber |
| 5,479,842 A | 1/1996 | Ostermeyer |
| 5,553,627 A | 9/1996 | Newkirk |
| D401,517 S | 11/1998 | Smith et al. |
| 5,897,492 A * | 4/1999 | Feller et al. ................ 206/363 |

* cited by examiner

Primary Examiner—Teresa Walberg
Assistant Examiner—Vinod D. Patel

(57) ABSTRACT

A new flavored thermometer for encouraging a child to keep a thermometer in their mouth. The inventive device includes a thermometer being adapted for taking the temperature of a person. The thermometer has a plurality of heat sensing portions thereon. Each of the sensing portions changes colors when heated. Each of said sensing portions changes colors at a different temperature. The thermometer has number indicia thereon corresponding to the sensing portions. A flavoring is positioned on the thermometer and coats the thermometer.

4 Claims, 2 Drawing Sheets

US 6,641,543 B1

FLAVORED THERMOMETER

BACKGROUND OF THE INVENTION

1. Field of the Invention

The present invention relates to thermometers and more particularly pertains to a new flavored thermomemter for encouraging a child to keep a thermometer in their mouth.

2. Description of the Prior Art

The use of thermometers is known in the prior art. More specifically, thermometers heretofore devised and utilized are known to consist basically of familiar, expected and obvious structural configurations, notwithstanding the myriad of designs encompassed by the crowded prior art which have been developed for the fulfillment of countless objectives and requirements.

Known prior art thermometers include U.S. Pat. Nos. 2,844,031; Des. 401,517; 5,553,627; 5,217,475; 5,479,842; and 2,425,945.

While these devices fulfill their respective, particular objectives and requirements, the aforementioned patents do not disclose a new flavored thermomemter. The inventive device includes a thermometer being adapted for taking the temperature of a person. The thermometer has a plurality of heat sensing portions thereon. Each of the sensing portions changes colors when heated. Each of said sensing portions changes colors at a different temperature. The thermometer has number indicia thereon corresponding to the sensing portions. A flavoring is positioned on the thermometer and coats the thermometer.

In these respects, the flavored thermomemter according to the present invention substantially departs from the conventional concepts and designs of the prior art, and in so doing provides an apparatus primarily developed for the purpose of encouraging a child to keep a thermometer in their mouth.

SUMMARY OF THE INVENTION

In view of the foregoing disadvantages inherent in the known types of thermometers now present in the prior art, the present invention provides a new flavored thermomemter construction wherein the same can be utilized for encouraging a child to keep a thermometer in their mouth.

The general purpose of the present invention, which will be described subsequently in greater detail, is to provide a new flavored thermometer apparatus and method which has many of the advantages of the thermometers mentioned heretofore and many novel features that result in a new flavored thermomemter which is not anticipated, rendered obvious, suggested, or even implied by any of the prior art thermometers, either alone or in any combination thereof.

To attain this, the present invention generally comprises a thermometer being adapted for taking the temperature of a person. The thermometer has a plurality of heat sensing portions thereon. Each of the sensing portions changes colors when heated. Each of said sensing portions changes colors at a different temperature. The thermometer has number indicia thereon corresponding to the sensing portions. A flavoring is positioned on the thermometer and coats the thermometer.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new flavored thermomemter apparatus and method which has many of the advantages of the thermometers mentioned heretofore and many novel features that result in a new flavored thermomemter which is not anticipated, rendered obvious, suggested, or even implied by any of the prior art thermometers, either alone or in any combination thereof.

It is another object of the present invention to provide a new flavored thermomemter which may be easily and efficiently manufactured and marketed.

It is a further object of the present invention to provide a new flavored thermomemter which is of a durable and reliable construction.

An even further object of the present invention is to provide a new flavored thermometer which is susceptible of a low cost of manufacture with regard to both materials and labor, and which accordingly is then susceptible of low prices of sale to the consuming public, thereby making such flavored thermometer economically available to the buying public.

Still yet another object of the present invention is to provide a new flavored thermometer which provides in the apparatuses and methods of the prior art some of the advantages thereof, while simultaneously overcoming some of the disadvantages normally associated therewith.

Still another object of the present invention is to provide a new flavored thermometer for encouraging a child to keep a thermometer in their mouth.

Yet another object of the present invention is to provide a new flavored thermometer which includes a thermometer being adapted for taking the temperature of a person. The thermometer has a plurality of heat sensing portions thereon. Each of the sensing portions changes colors when heated. Each of said sensing portions changes colors at a different temperature. The thermometer has number indicia thereon corresponding to the sensing portions. A flavoring is positioned on the thermometer and coats the thermometer.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
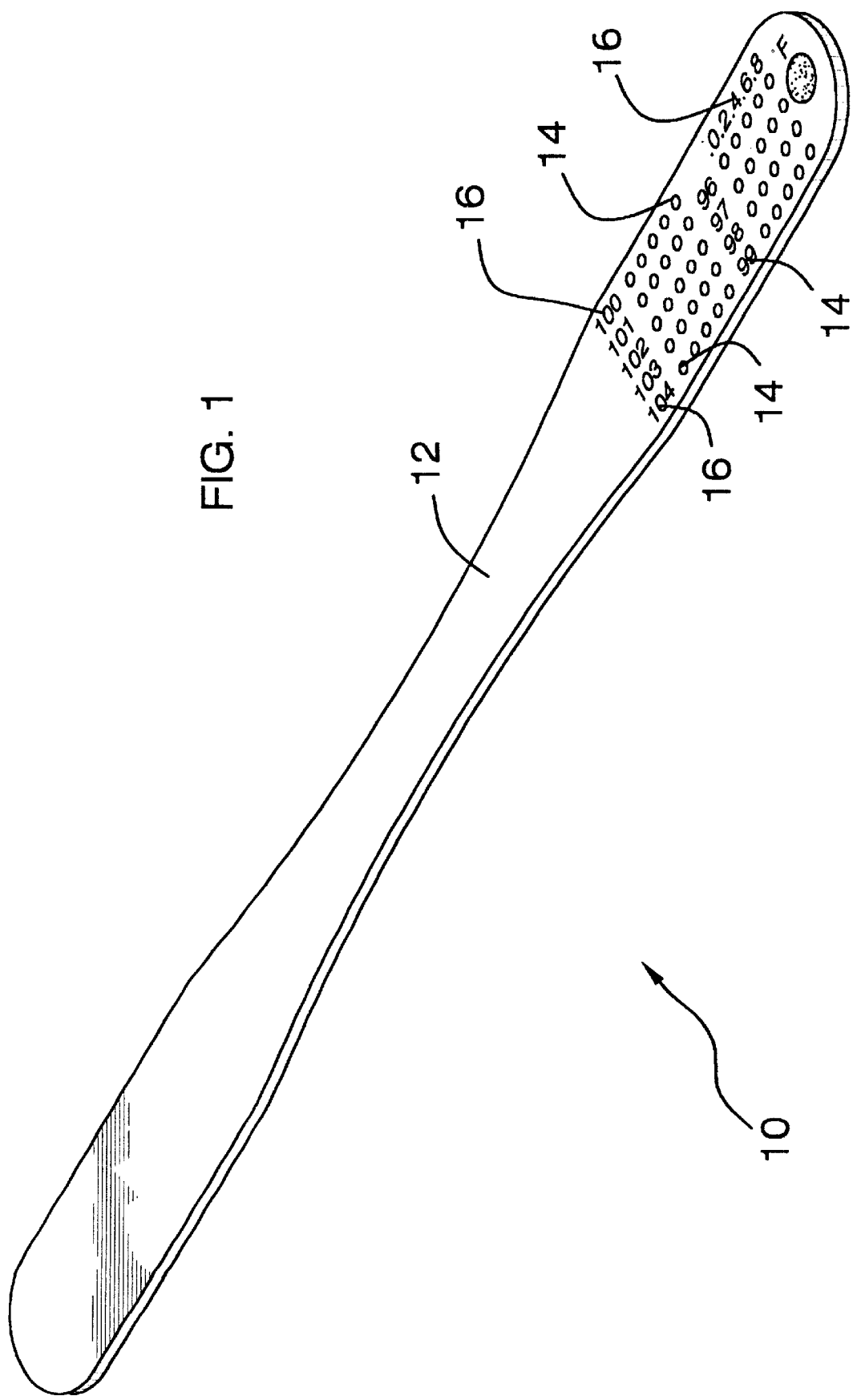
FIG. 1 is a schematic perspective view of a new flavored thermometer according to the present invention.
Figure 2:
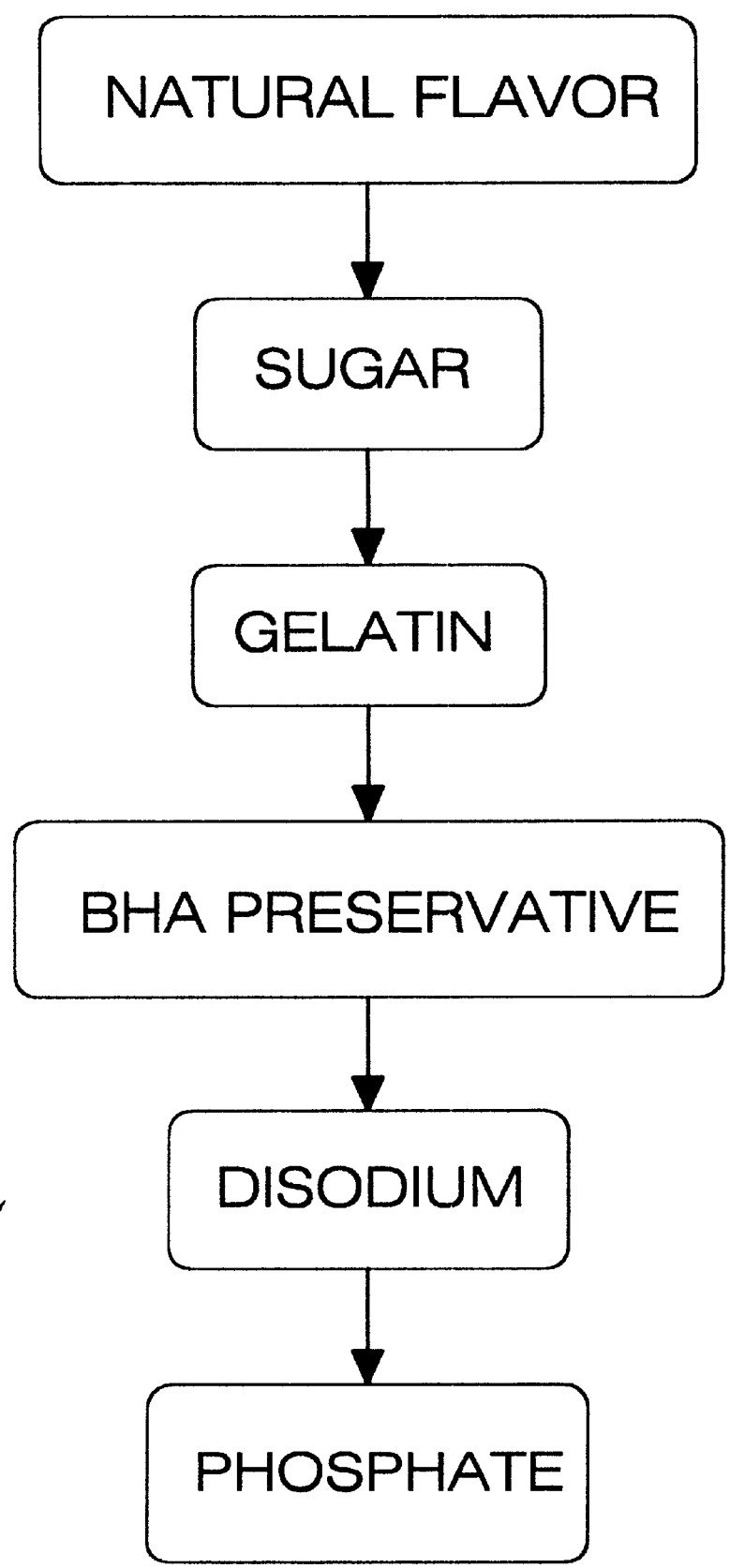
FIG. 2 is a schematic plan view of ingredients of the flavoring of the present invention.

With reference now to the drawings, and in particular to FIGS. 1 and 2 thereof, a new flavored thermometer embodying the principles and concepts of the present invention and generally designated by the reference numeral 10 will be described.

As best illustrated in FIGS. 1 and 2, the flavored thermometer 10 comprises a thermometer 12 for taking the temperature of a person. The thermometer 12 has a plurality of heat sensing portions 14 thereon. Each of the sensing portions changes colors when heated. Each of the sensing portions 14 changes at colors at a different temperature. The thermometer 12 has number indicia 16 thereon corresponding to the sensing portions. The thermometer 12 is of the conventional type using a chemical reaction to measure exothermic energy, which are used to take the body temperature of persons by placement in the mouth of a person.

A flavoring 18 is positioned on the thermometer. The flavoring 18 coats the thermometer 12. The flavoring 18 may include sucrose and a preservative. Typical additives are shown in FIG. 2. The flavoring 18 is selected from the group consisting of cherry, orange, strawberry, grape, lemon and lime and may be only extracts from those fruits with added table sugar.

In use, the chemical, or thermally reactive, thermometers typically do not have a pleasant flavor. The flavoring makes it pleasant for a child to have the thermometer in their mouth for the requisite amount of time needed to heat the thermometer to give an accurate measurement of the person's temperature.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A flavored thermometer system including:
   a thermometer for taking the temperature of a person, said thermometer having a plurality of heat sensing portions thereon, each of said sensing portions changing colors when heated, each of said sensing portions changing at colors at a different temperature, said thermometer having number indicia thereon corresponding to said sensing portions; and
   a flavoring positioned on said thermometer, said flavoring coating said thermometer.

2. The flavored thermometer system of claim 1 wherein said flavoring includes a sucrose and a preservative.

3. The flavored thermometer system of claim 1 wherein said flavoring is selected from the group consisting of cherry, orange, strawberry, grape, lemon and lime.

4. The flavored thermometer system of claim 1 wherein said flavoring includes a sucrose and a preservative; and
   wherein said flavoring is selected from the group consisting of cherry, orange, strawberry, grape, lemon and lime.

\* \* \* \* \*